July 21, 1970 H. A. BENTZINGER 3,521,599
GASKETING MACHINE
Filed Aug. 5, 1968 2 Sheets-Sheet 1

INVENTOR
HARLAN A. BENTZINGER
BY *Konway Jenney*
*& Hildreth*
ATTORNEYS

July 21, 1970  H. A. BENTZINGER  3,521,599
GASKETING MACHINE

Filed Aug. 5, 1968  2 Sheets-Sheet 2

INVENTOR
HARLAN A. BENTZINGER
BY
ATTORNEYS

United States Patent Office 3,521,599
Patented July 21, 1970

---

3,521,599
GASKETING MACHINE
Harlan A. Bentzinger, Rehoboth, Mass., assignor to Chemical Products Corporation, Providence, R.I., a corporation of Rhode Island
Filed Aug. 5, 1968, Ser. No. 750,243
Int. Cl. B05c 7/02, 11/00
U.S. Cl. 118—6                                    7 Claims

ABSTRACT OF THE DISCLOSURE

A machine for applying gaskets performs a number of its operations under the control of a pulse counter. Pulses are produced by a pulse generator mechanically coupled to a rotating spindle upon which a container closure or other part is placed. The pulse-controlled operations include opening and closing the nozzle for the gasket material, spindle elevation and retraction, and closure loading and indexing.

BACKGROUND OF THE INVENTION

This invention relates generally to the manufacture of parts having annular gaskets or the like. The method involves positioning upon a spindle a part to which the gasket is to be applied, for instance a lug or screw-on container closure or cap, and rotating the spindle while opening and then closing a nozzle in position to dispense a liquid liner or gasket material in an annular ring near the periphery of the part or closure. The method as thus generally described is well known and now in common use, an example of a closure lining machine being shown in the U.S. patent to Shanklin et al. No. 2,524,545.

As currently practiced, this so-called spun-in method makes use of the centrifugal force generated in the lining liquid by the spinning of the closure to spread the liquid radially and in some cases to cause it to reach the rim wall or even to advance up the wall to some extent. This produces a more evenly spread, uniform sealing surface on the lining material and thus a more effective seal. This spinning is usually continued after the nozzle has been closed for an added period of time called the "overspin." After the liner has been applied, the closure is removed from the machine by conventional means and the liner material is allowed to harden either by solvent evaporation, heat or chemical change depending on the material being used.

A difficulty with the foregoing method arises from the necessity of controlling the opening and closing of the lining nozzle with great accuracy in order to dispense the correct amount of material in each closure. To this end, the means hitherto used have consisted in mechanical devices and linkages including gears, cams and cam followers arranged to correlate the several machine functions such as closure loading and feed, spindle operation, and opening and closing of the lining nozzle. Such means require careful adjustment which is dependent on play in the mechanical parts as well as on such variable conditions as the diameter of the closure, the flow characteristics of the lining liquid and the desired thickness and width of the lining ring or annulus. Moreover, changes in any of these conditions necessitate readjustments in the mechanical linkages which are time-consuming and often require a period of trial-and-error before satisfactory results in production are obtained.

Problems also arise from the fact that the liner annulus is fed onto the closure progressively. Care must be taken to form a complete circle of the lining material, and to this end an overlap is provided, such overlap being in some cases approximately equal to the full circumference of the liner. The overlap results in a nonuniformity in the quantity of material in the cross section and hence in the thickness of the liner with an attendant possibility of poor sealing qualities. This is only partly overcome by spreading of the material during overspinning.

SUMMARY OF THE INVENTION

This invention provides an improved method of controlling precisely the timing of the various machine functions, thereby making the results more uniform as to the quantity of material dispensed, the angular rotation of the closure while the material is being dispensed, and the angle and hence the time duration of the overspin. The timing functions are performed by a pulse counter having means for readily selecting and changing the pulse counts at which the various operations are initiated or terminated. A pulse generator is directly and mechanically engaged with the spindle. By this means the interval between successive pulses corresponds precisely to a given angular rotation of the closure and the closure and spindle become, in effect, a timing clock for all related machine functions. The invention applies generally to the manufacture of parts having annular rings or gaskets thereon, as further discussed below.

DESCRIPTION OF THE PREFERRED EMBODIMENT

Figure 1:
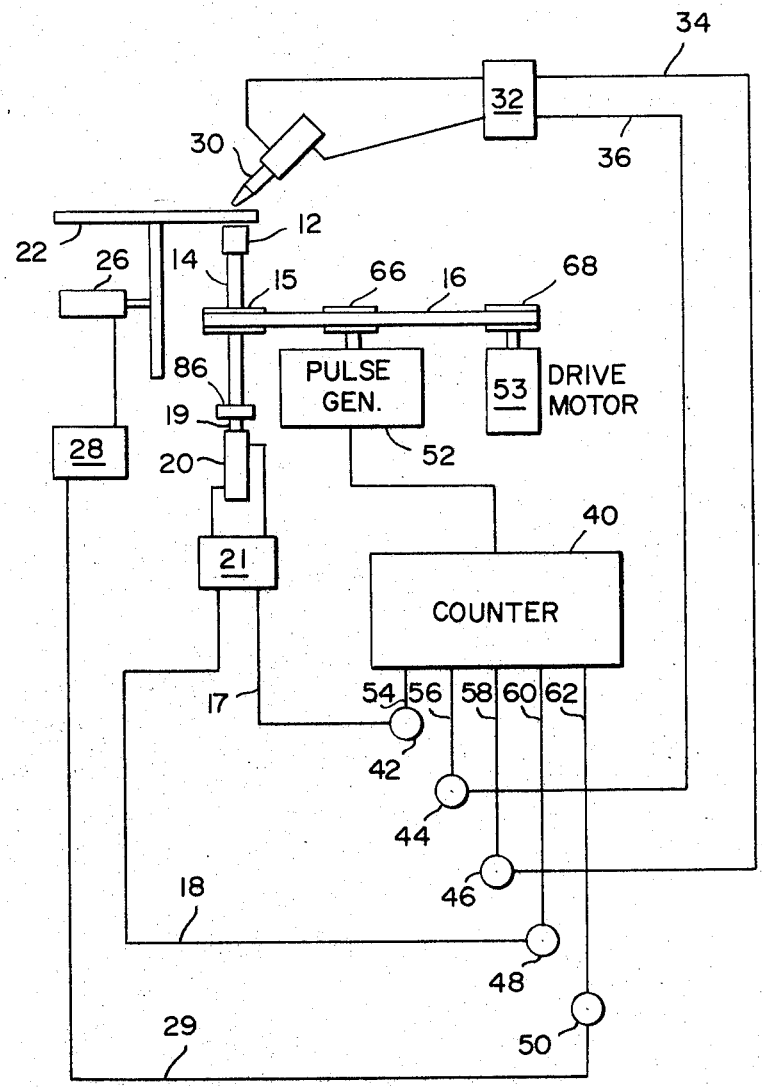
FIG. 1 is a schematic diagram of the principal components of a closure lining machine according to this invention.

Referring to the drawings, a magnet chuck 12 to hold the closure is threaded to a vertical closure spindle 14 pinned to a pulley 15 rotated by means of a timing belt 16. The shaft may be raised along its axis by energizing a lead 17, or lowered by energizing a lead 18 by means of a plunger 19 extending from an air cylinder 20. The cylinder is operated by an air valve 21. Details of these parts are further described below. A conventional indexing closure loading and feeding mechanism is provided and includes a star wheel 22 loaded with closures 24 about its periphery. Indexing means 26 for the star wheel are conventional in form and are not further described. These means cause the star wheel to advance a step at a time when a solenoid-operated air valve 28 is electrically energized by means of a pulse on a lead 29. Thereby, an unlined closure is advanced to and centered over the downwardly retracted spindle 14. Thereafter, the spindle is elevated to a raised position operatively associated with a nozzle 30. The nozzle is opened by a solenoid air valve 32 when a pulse is received on a lead 34, and closed when a pulse is received on a lead 36.

The spindle 14 rotates continuously during the interval in which the nozzle, which is supplied with liquid lining material continuously under pressure, delivers the material to the closure in an annular ring 38. The spindle also preferably but not necessarily continues to rotate after the nozzle has been closed to cause the material to spread upon the surface of the closure.

The timing of the foregoing functions is controlled by a pulse counter 40 which is advanced one count or step for each pulse generated by a pulse generator 52. The pulse generator has a pulley turned by the timing belt 16 and the belt is driven by a continuously rotating drive motor 53.

Associated with the output circuits of the digit stages of the counter are operation preset controls 42, 44, 46, 48 and 50 respectively connected to the leads 17, 36, 34, 18 and 29. The counter is of a commercially available type and comprises a number of numerical stages and output circuits 54, 56, 58, 60 and 62 from the stages to the operation preset controls. By these means it is possible to cause a pulse to be produced on any one of the leads 17, 36, 34, 18 or 29 when the counter has advanced a preset number of steps or pulses past a reference or reset-to-zero count condition. Details of the counter circuits form no part of the invention and are not further described.

Figure 2:
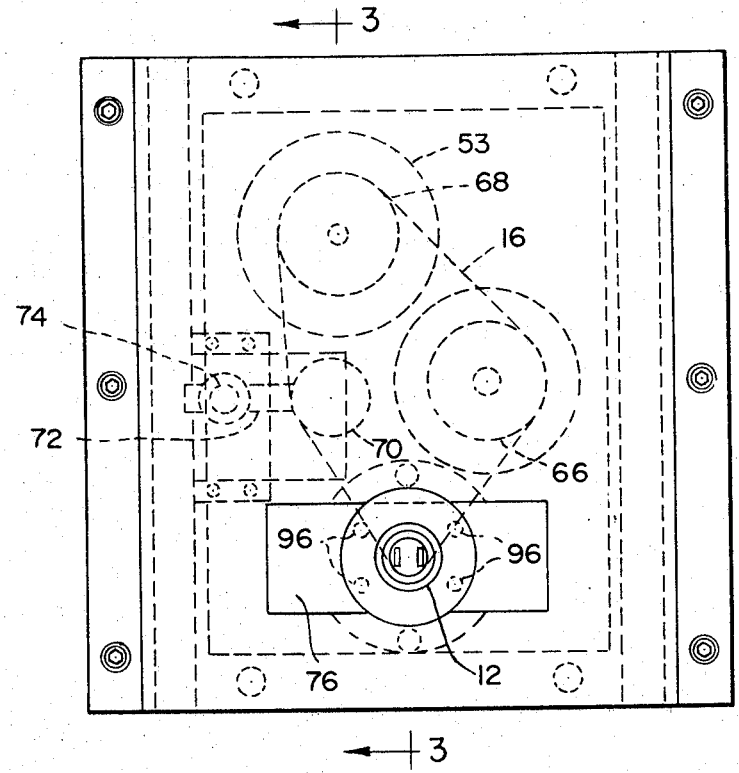
FIG. 2 is a plan view of the assembly comprising the drive motor, the spindle and the pulse generator.
Figure 3:
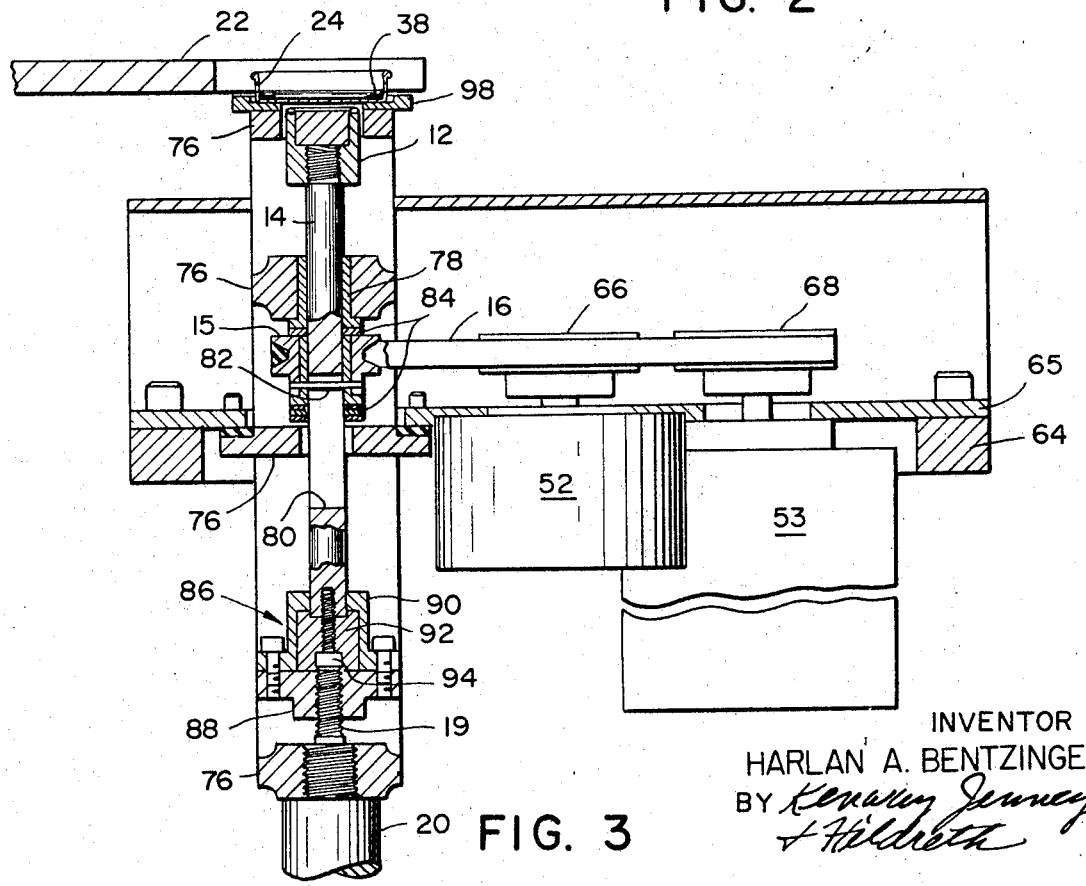
FIG. 3 is an elevation in section taken on line 3—3 of FIG. 2.

Details of the drive motor, pulse counter and closure spindle and chuck are shown in FIGS. 2 and 3. The assembly is mounted on a common base 64 to which is secured a base plate 65. The stators of the drive motor 53 and pulse generator 52 are mounted under holes in the base plate and have shafts with pulleys 66 and 68 projecting above the base plate. The timing belt 16 passes over these pulleys and also over the pulley 15 on the spindle 14 and an idler pulley 70. The idler pulley is rotatable in one end of an arm 72 adjustably pivoted at the other end on a stud shaft 74 projecting from the base plate. Its function is to ensure adequate tension without slippage of the belt 16 over the pulleys.

The closure spindle 14 is journaled in a spindle frame 76 bolted to the base plate 65. For this purpose the frame 76 has a flange-type bearing 78 receiving the spindle. The spindle has a diametral longitudinally extending through slot 80, and a roll pin 82 passes through this slot and the pulley 15. Thus the spindle rotates with the pulley 15 may be elevated or retracted in relation to it, the pulley being axially retained by thrust washers 84.

The closure spindle 14 is axially supported by a thrust bearing assembly designated generally at 86, this assembly being threaded to the plunger 19 of the air cylinder 20 (FIG. 1). The air cylinder is threaded in the spindle frame 76. The thrust bearing assembly includes a bearing plate 88 with threads to receive the plunger, a bearing housing 90 bolted to the plate 88, and a bearing spindle 92 rotatably received in the housing and fastened to the spindle 14 by a cap screw 94.

The pulse generator 52 may be of any commercially available form, for example electronic or magntic, and is adapted to produce a predetermined number of sharp wavefront pulses for each revolution of the pulley 66. The time interval between pulses corresponds precisely to a given angle of rotation of the generator pulley 66. Thus the ratio of the effective diameters of the pulleys 15 and 66 determines precisely a corresponding angle of rotation of the spindle 14 for this same pulse time interval. For example, the pulse interval may correspond to one-hundredth of a revolution of the spindle 14. Preferably, provision is made to exchange the pulleys 15 and 66 for other pulleys of different effective diameters when it is desired to have more or fewer pulses per revolution of the spindle 14.

The operation of the closure lining machine may be described with reference to the given example, in which there are 100 pulses per revolution of the spindle 14. Assume that a closure 24 is in position on the star wheel 22 and that the chuck is in the downwardly retracted position as shown in FIG. 3. The closure is held in place by four magnets 96 in a detachable insert 98 fitted on the spindle frame 76. This insert may also be exchanged for inserts of other sizes for closures of different diameters.

The operation preset controls 17, 36, 34, 18 and 29 may be respectively set as follows: spindle up, "0"; nozzle open, "10"; nozzle closed, "110"; spindle down, "160"; advance star wheel "170." In this case, after the spindle is raised the nozzle will open for exactly one full revolution of the closure and the overspin will comprise exactly one-half revolution. It will be understood that the capacity of the counter at which it reaches its count capacity and resets to zero is greater than the highest preset count value to be employed to initiate or terminate any operation.

If double thickness or two-turn liners are to be prepared to minimize the lap thickness, the preset control 46 is set to a count value exceeding that of the preset control 44 by "200." Likewise, the overspin and other functions can be varied in duration to produce the desired result.

It will be noted that the foregoing operations are all separately and independently controlled and are related only by the fact that they are all determined by the counter 40. Thus they are initiated or terminated as direct functions of the angular position of the closure. The operation preset values may take into account such delay factors as valve operation time, air flow in hoses and material thixotropy, thereby producing optimum and uniform results.

As a result of the precise control obtained with this invention, it is possible to speed up the rate of lining the closures per spindle, since one-turn lining may be employed without the hazard of producing either an incomplete annulus or an undesirable lap in the liner material.

The described machine may be used with a variety of liner materials including but not limited to plastisols, polyurethanes and natural or synthetic rubbers. Liners can be applied to can ends as well as to cap closures of various kinds. The machine can be used as a laboratory machine as well as a production machine. Laboratory conditions may thus accurately reproduce the conditions during production, and therefore lining compound may be supplied for production with data sheets specifying the inset 98 and diameters of pulleys which produced optimum results in laboratory tests. Production machine operators are thereby saved considerable time in setting up the lining machines.

The present invention also has utility for applications outside the field of closure liners, since the operations herein described encompass the accurate placement of an annular ring of liquid material on any part. Thus for one illustration, it may be employed in the manufacture of various kinds of fasteners. Other applications will also occur to those skilled in this art.

While air cylinders have been described as the motion-producing devices, it will be understood that other equivalent means may be used, such as solenoids or electric motors. Likewise, the magnet chuck 12 may be replaced by another form of chuck, such as a vacuum chuck.

Other variations, adaptations and modifications of the machine may be accomplished by one skilled in this art without departing from the spirit or scope of this invention.

I claim:

1. A gasketing machine having, in combination,
   a rotatable spindle having means to support a part to be gasketed,
   drive means,
   means connecting the drive means to the spindle,
   a pulse generator having a rotating part synchronized with the drive means and adapted to produce a predetermined number of pulses per revolution,
   a nozzle for gasket material,
   nozzle opening and closing means,
   a pulse counter operatively associated with the pulse generator,
   and control means operable by the counter to open and close the nozzle as a function of count values in the counter.

2. The combination according to claim 1, in which the spindle, drive means and pulse generator are connected by a timing belt.

3. The combination according to claim 1, in which the control means include operation preset controls for opening and closing the nozzle.

4. The combination according to claim 1, with spindle elevation and retraction means operated by the control means.

5. The combination according to claim 1, with index means for advancing parts to be gasketed seriatim to an operative position over the spindle, said index means being operated by the control means.

6. The combination according to claim 1, with spindle elevation and retraction means and index means for advancing parts to be gasketed seriatim to an operative position over the spindle, said index means and spindle elevation and retraction means being operated by the control means.

7. A machine for placing an annular ring of liquid material upon a part, said machine having, in combination,
    a rotatable part-holding spindle,
    drive means,
    means connecting the drive means to the spindle,
    a pulse generator having a rotating part synchronized with the drive means and adapted to produce a predetermined number of pulses per revolution,
    a nozzle for the liquid material,
    nozzle opening and closing means,
    a pulse counter operatively associated with the pulse generator,
    and control means operable by the counter to open and close the nozzle as a function of count values in the counter.

References Cited

UNITED STATES PATENTS

| | | |
|---|---|---|
| 2,608,177 | 8/1952 | Powers. |
| 3,331,354 | 7/1967 | Roland _____ 118—409 X |

JOHN P. McINTOSH, Primary Examiner

U.S. Cl. X.R.

118—7, 9, 318, 319